United States Patent
Lee et al.

(10) Patent No.: US 9,538,101 B2
(45) Date of Patent: Jan. 3, 2017

(54) IMAGE SENSOR, IMAGE PROCESSING SYSTEM INCLUDING THE SAME, AND METHOD OF OPERATING THE SAME

(71) Applicant: Samsung Electronics Co., Ltd., Suwon-Si, Gyeonggi-Do (KR)

(72) Inventors: Han Soo Lee, Hwaseong-si (KR); Tae-Chan Kim, Yongin-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 185 days.

(21) Appl. No.: 14/291,975

(22) Filed: May 30, 2014

(65) Prior Publication Data

US 2014/0375851 A1    Dec. 25, 2014

(30) Foreign Application Priority Data

Jun. 19, 2013  (KR) .................. 10-2013-0070563

(51) Int. Cl.
| | | |
|---|---|---|
| *H04N 5/335* | (2011.01) | |
| *G01S 13/00* | (2006.01) | |
| *H04N 5/357* | (2011.01) | |
| *H04N 5/376* | (2011.01) | |
| *G01S 7/491* | (2006.01) | |
| *G01S 7/497* | (2006.01) | |

(52) U.S. Cl.
CPC .............. *H04N 5/335* (2013.01); *G01S 7/497* (2013.01); *G01S 7/4914* (2013.01); *G01S 13/00* (2013.01); *H04N 5/357* (2013.01); *H04N 5/3765* (2013.01)

(58) Field of Classification Search
CPC ..................... G01S 17/08–17/36; H04N 13/02
USPC .......................... 348/294–308; 356/5.01–5.08
See application file for complete search history.

(56) References Cited

U.S. PATENT DOCUMENTS

| | | |
|---|---|---|
| 6,323,942 B1 | 11/2001 | Bamji |
| 2009/0123061 A1 | 5/2009 | Kang et al. |
| 2011/0129123 A1 | 6/2011 | Ovsiannikov et al. |
| 2011/0157354 A1 | 6/2011 | Kawahito |
| 2011/0188026 A1 | 8/2011 | Lee et al. |
| 2012/0019299 A1 | 1/2012 | McLeod et al. |
| 2012/0062705 A1 | 3/2012 | Ovsiannikov et al. |
| 2012/0098964 A1 | 4/2012 | Oggier et al. |
| 2012/0121165 A1 | 5/2012 | Ko et al. |
| 2012/0173184 A1 | 7/2012 | Ovsiannikov et al. |
| 2013/0176550 A1* | 7/2013 | Ovsiannikov ........... G01S 17/10 356/5.01 |
| 2014/0009650 A1* | 1/2014 | Kim et al. .................... 348/294 |

FOREIGN PATENT DOCUMENTS

JP    2011179925 A    9/2011

* cited by examiner

*Primary Examiner* — Sinh Tran
*Assistant Examiner* — Selam Gebriel
(74) *Attorney, Agent, or Firm* — Harness, Dickey & Pierce, P.L.C.

(57) ABSTRACT

An image sensor includes a photo gate controller configured to generate a plurality of demodulated signals respectively corresponding to a plurality of rows of a pixel array and a photo gate driver configured to adjust a phase of the demodulated signals using a source clock signal to remove power, voltage and temperature (PVT) noise and to apply the phase-adjusted demodulated signals to the pixel array. The image sensor matches the phases of the respective demodulated signals using the source clock signal generated based on a reference clock signal, thereby increasing the quality of depth images.

15 Claims, 20 Drawing Sheets

IMAGE SENSOR, IMAGE PROCESSING SYSTEM INCLUDING THE SAME, AND METHOD OF OPERATING THE SAME

CROSS-REFERENCE TO RELATED APPLICATIONS

This application claims priority under 35 U.S.C. §119(a) from Korean Patent Application No. 10-2013-0070563 filed on Jun. 19, 2013, the disclosure of which is hereby incorporated by reference in its entirety.

BACKGROUND

Example embodiments of inventive concepts relate to an image sensor, an image processing system including the same, and/or a method of operating the same.

With the rapid increase of demand for smartphones, there has been a lot of development of image sensors. Image sensors include a plurality of pixels converting photons in a set spectrum band into electrons.

Information about the depth between an object and an image sensor as well as information about color is used to obtain a three-dimensional (3D) image. Methods of obtaining the information about the depth between the object and the image sensor may be divided into two types: (i) active methods and (ii) passive methods.

A time-of-flight (TOF) and a triangulation method are representative active methods. In the TOF method, modulated light is emitted to an object, light reflected from the object is sensed, and the depth is calculated from a phase change. In the triangulation method, the position of light emitted by a laser or the like in a certain distance from a sensor and the position of reflected light are sensed and the depth is calculated using triangulation. In the passive methods, the depth is calculated using only image information without emitting light. A stereo camera is an example of a passive method.

SUMMARY

According to at least some example embodiments of inventive concepts, there is provided a method of operating an image sensor. The method includes generating a plurality of demodulated signals respectively corresponding to a plurality of rows of a pixel array; and adjusting a phase of the demodulated signals using a source clock signal to remove power, voltage and temperature (PVT) noise and applying the phase-adjusted demodulated signals to the pixel array.

The method may further include transmitting the demodulated signals and a reference clock signal on the same PVT.

The method may further include generating the source clock signal having an opposite phase to a phase of the reference clock signal.

The adjusting the phase of the demodulated signals may include changing the phase of the demodulated signals in response to a rising edge of the source clock signal.

The method may further include outputting image data by reading pixel signals output from the pixel array according to the phase-adjusted demodulated signals and generating depth image data based on the image data using time-of-flight (TOF).

The source clock signal may be applied in an A direction perpendicular to a progress direction of the demodulated signals.

Alternatively, the source clock signal may be applied in the A direction perpendicular to the progress direction of the demodulated signals and a B direction opposite to the A direction.

Each of the plurality of rows may include pixels having a 2-tap structure.

According to another example embodiment of inventive concepts, there is provided an image sensor including a photo gate controller configured to generate a plurality of demodulated signals respectively corresponding to a plurality of rows of a pixel array; and a photo gate driver configured to adjust a phase of the demodulated signals using a source clock signal to remove PVT noise and to apply the phase-adjusted demodulated signals to the pixel array.

The image sensor may further include a timing generator configured to transmit the demodulated signals and a reference clock signal on the same PVT.

The timing generator may include a plurality of first buffer groups configured to transmit the demodulated signals and a second buffer group configured to transmit the reference clock signal. The number of buffers included in each of the first buffer groups and the second buffer group may be based on a path through which the demodulated signals and the reference clock signal are transmitted.

The photo gate controller may receive a reference clock signal and generate the demodulated signals. A phase of the demodulated signals may be one of first through fourth phases and a frequency of the demodulated signals may be lower than a frequency of the reference clock signal.

The photo gate driver may generate the source clock signal having an opposite phase to a phase of a reference clock signal.

The photo gate driver may include a phase matching block configured to change the phase of the demodulated signals in response to a rising edge of the source clock signal.

The phase matching block may include a plurality of D flip-flops that change the phase of the demodulated signals, respectively.

The source clock signal may be applied in a direction perpendicular to a progress direction of the demodulated signals.

Alternatively, the source clock signal may be applied in a direction perpendicular to the progress direction of the demodulated signals and an opposite direction.

The pixel array may include a plurality of pixels that sense photocharges generated from incident light according to the phase-adjusted demodulate signals and respectively output pixel signals.

The pixels may have a 2-tap structure.

The image sensor may further include a readout circuit configured to output image data obtained by performing analog-to-digital conversion on the pixel signals and a row decoder configured to output control signals for driving the pixel array in units of rows.

According to another example embodiment of inventive concepts, there is provided an image sensor including a pixel array including a plurality of pixels configured to sense photocharge generated from incident light and to output a pixel signal; and a photo gate driver configured to adjust a phase of a plurality of demodulated signals respectively corresponding to a plurality of rows of the pixel array using a source clock signal to remove PVT noise and to apply phase-adjusted demodulated signals to the pixel array.

The image sensor may further include a photo gate controller configured to generate the plurality of demodulated signals respectively corresponding to the plurality of rows of the pixel array and a timing generator configured to transmit the demodulated signals and a reference clock signal on the same PVT conditions.

The photo gate driver may generate the source clock signal having an opposite phase to a phase of the reference clock signal.

The source clock signal may be applied in an A direction perpendicular to a progress direction of the demodulated signals and a B direction opposite to the A direction.

According to another example embodiment of inventive concepts, there is provided an image processing system including an image sensor configured to generate image data based on pixel signals, which are generated from photocharge generated from incident light, according to a plurality of demodulated signals respectively corresponding to a plurality of rows of a pixel array; and an image signal processor configured to generate depth image data based on the image data using a TOF. The image sensor may include a photo gate driver configured to adjust a phase of the demodulated signals using a source clock signal to remove PVT noise and to apply phase-adjusted demodulated signals to the pixel array.

At least one example embodiment discloses an image processing system including an image sensor having a pixel array including rows of pixels and configured to produce image data, a timing generator configured to generate a plurality of gate control signals based on a reference clock, each gate control signal corresponding to one of the rows of the pixel array and a gate driver configured to generate matched gate control signals by changing the phases of the plurality of gate control signals such that the generated matched gate control signals have a desired phase, the gate driver configured to apply the generated matched gate control signals to the pixel array of the image sensor.

In an example embodiment, the gate driver is configured to generate a source clock signal based on the reference clock signal, the source clock signal having a phase difference from the photo gate control signals that is smaller than a phase difference between the reference clock signal and the photo gate control signals, the matched gate control signals being based on the source clock signal.

In an example embodiment, the gate driver is configured to generate the source clock signal to have a 180 degree phase difference from the reference clock signal.

In an example embodiment, the gate driver is configured to generate the source clock signal to have a frequency higher than a frequency of the gate control signals.

In an example embodiment, the gate driver includes a source clock generator configured to generate the source clock signal, the source clock generator being between lines carrying the gate control signals.

BRIEF DESCRIPTION OF THE DRAWINGS

The above and other features and advantages of inventive concepts will become more apparent by describing in detail example embodiments thereof with reference to the attached drawings in which.

DETAILED DESCRIPTION

Figure 1:
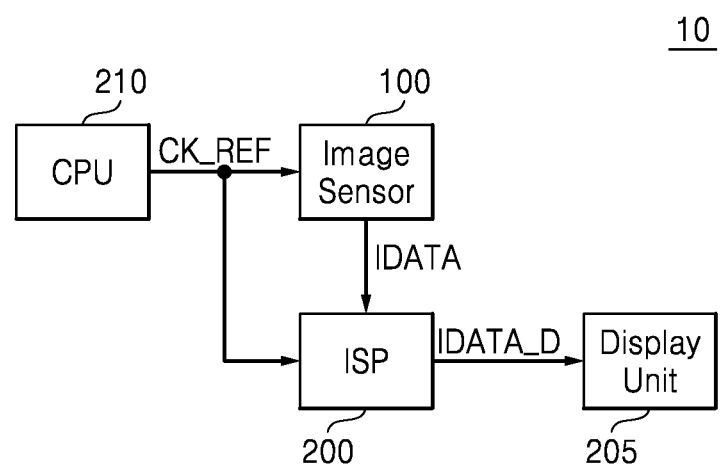
FIG. 1 is a block diagram of an image processing system according to an example embodiment of inventive concepts.

Inventive concepts now will be described more fully hereinafter with reference to the accompanying drawings, in which example embodiments are shown. Example embodiments may, however, be embodied in many different forms and should not be construed as limited to example embodiments set forth herein. Rather, example embodiments are provided so that this disclosure will be thorough and complete, and will fully convey the scope of example embodiments to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of an image processing system 10 according to an example embodiment of inventive concepts. The image processing system 10 may include an image sensor 100, an image signal processor (ISP) 200, a display unit 205, and a central processing unit (CPU) 210.

The image processing system 10 may be implemented in a system on chip (SoC). In other embodiments, each of the image sensor 100, the ISP 200, and the CPU 210 may be implemented in a SoC. The image processing system 10 may function as a depth sensor that acquires depth information of an object and/or a color sensor that acquires color information of the object.

When the image sensor 100 includes depth sensor pixels, the image sensor 100 may transmit image data IDATA corresponding to depth information (or depth image) of an object to the ISP 200 based on a pixel signal, which is output from each of the depth sensor pixels, in response to a reference clock signal CK_REF received from the CPU 210. When the image sensor 100 includes color sensor pixels, the image sensor 100 may transmit the image data IDATA corresponding to color information of an object to the ISP 200 based on a pixel signal, which is output from each of the color sensor pixels, in response to the reference clock signal CK_REF received from the CPU 210. The image sensor 100 may be implemented in a separate chip. The image sensor 100 may be implemented as a complementary metal oxide semiconductor (CMOS) image sensor chip.

The ISP 200 may generate depth information from the image data IDATA using a time-of-flight (TOF) and may generate depth image data IDATA_D based on the depth information. The ISP 200 may process or construct the image data IDATA in units of frames. The ISP 200 may also correct the light and shade, contrast and/or chroma of the image data IDATA. The ISP 200 may transmit the depth image data IDATA_D to the display unit 205 based on the processing of the image data IDATA. The ISP 200 may operate in synchronization with the reference clock signal CK_REF.

The display unit 205 may be a display that can display the depth image data IDATA_D. The display unit 205 may be implemented as a liquid crystal display (LCD), a light emitting diode (LED) display, an organic LED (OLED) display, an active matrix OLED (AMOLED) display, or a flexible display.

The CPU 210 may generate the reference clock signal CK_REF using a unit (for example, including a phase locked loop (PLL) circuit and an oscillator) that can generate a clock signal and may transmit the reference clock signal CK_REF to the image sensor 100 and the ISP 200. The unit that generates the clock signal may be implemented independently from the CPU 210 and the reference clock signal CK_REF may be received from an outside of the image processing system 10.

Figure 2:
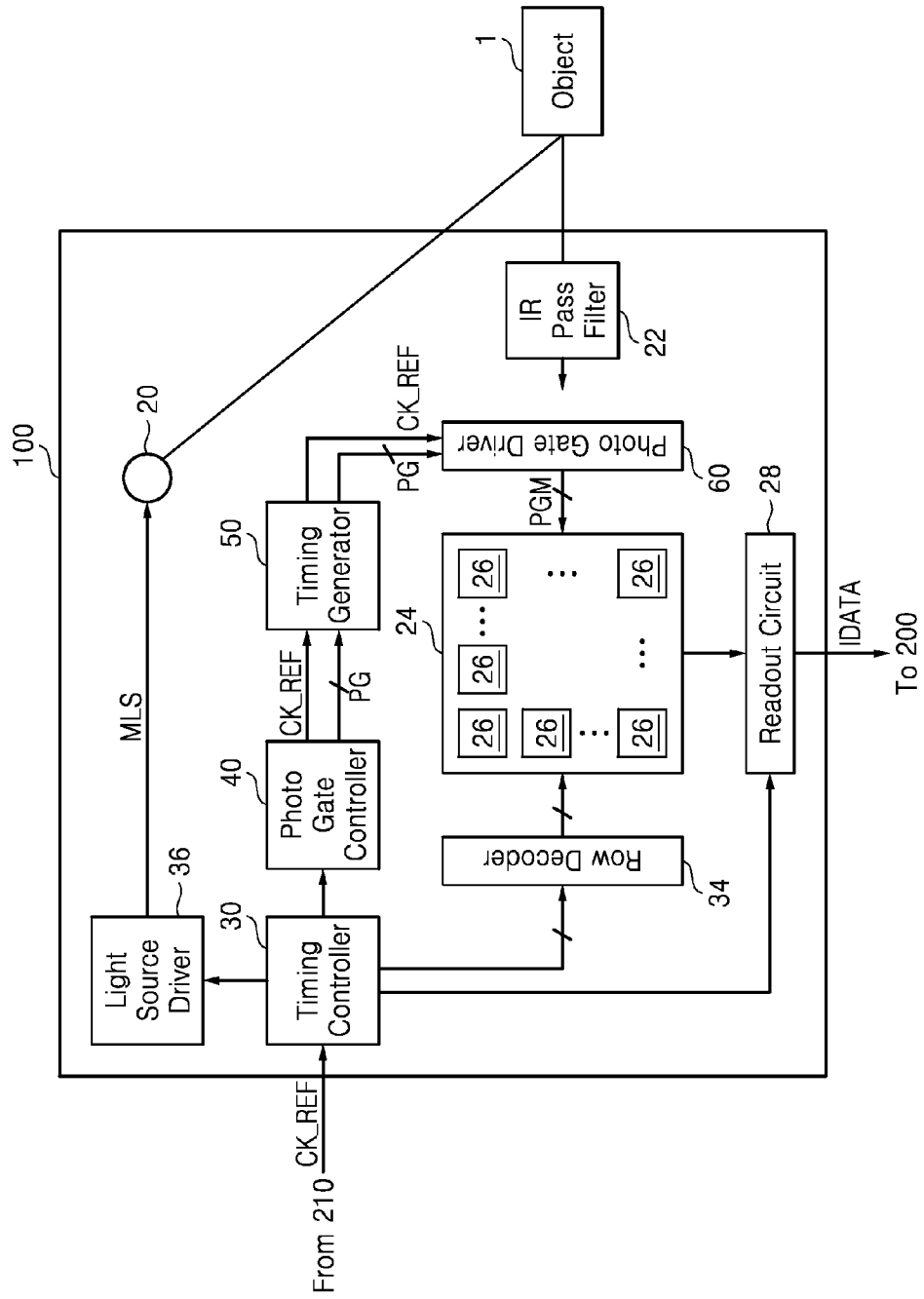
FIG. 2 is a block diagram of an image sensor illustrated in FIG. 1 according to an example embodiment of inventive concepts.

FIG. 2 is a block diagram of the image sensor 100 illustrated in FIG. 1 according to an example embodiment of inventive concepts. For clarity of the description, an object 1 is illustrated with the image sensor 100. Referring to FIG. 2, the image sensor 100 may include a light source 20, an infrared (IR) pass filter 22, a pixel array 24, a readout circuit 28, a timing controller 30, a row decoder 34, a light source driver 36, a photo gate controller 40, a timing generator 50, and a photo gate driver 60.

The image sensor 100 may obtain the image data IDATA corresponding to depth information (or depth image) of the object 1 using the TOF principle. The image sensor 100 may operate in rolling shutter mode or global shutter mode.

The light source 20 may emit a modulated optical signal, e.g., infrared rays to the object 1 in response to a control signal MLS of the light source driver 36. The IR pass filter 22 may pass only an optical signal that has been emitted from the light source 20 and then reflected from the object 1 to the pixel array 24.

The pixel array 24 may include a plurality of pixels 26. Each of the pixels 26 will be described in detail with reference to FIGS. 3 and 4 later. Each pixel 26 may be implemented as a TOF sensor pixel.

The readout circuit 28 may generate the image data IDATA based on pixel signals output from the pixel array 24. The readout circuit 28 may include a correlated double sampling (CDS) block (not shown) that performs CDS on a pixel signal, i.e., a reset signal and an image signal, received from a row selected in the pixel array 24; an analog-to-digital converter (ADC) (not shown) that compares a ramp signal with a CDS signal output from the CDS block and counts a comparison result signal to generate a digital signal; and a buffer (not shown) that temporarily stores the digital signal from the ADC and senses and amplifies the digital signal before outputting it.

The timing controller 30 may control the elements (i.e., the readout circuit 28, the row decoder 34, the light source driver 36, and/or the photo gate controller 40) of the image sensor 100 based on the reference clock signal CK_REF received from the CPU 210.

The row decoder 34 may decode a plurality of row control signals, e.g., row address signals output from the timing controller 30 and may drive a particular row among the plurality of rows in the pixel array 24 according to the decoding result. The row decoder 34 may output a plurality of control signals (e.g., a reset signal RS and a select signal SEL illustrated in FIGS. 3 and 4) to drive the particular row among the plurality of rows in the pixel array 24. The row decoder 34 may include a row driver that drives a row. The light source driver 36 may generate the control signal MLS for driving the light source 20 according to the control of the timing controller 30.

The photo gate controller 40 may buffer and output the reference clock signal CK_REF output from the timing controller 30 and may generate photo gate control signals PG (i.e., PG1 through PGn) using the reference clock signal CK_REF. The photo gate control signals PG are demodulated signals corresponding to the rows, respectively, of the pixel array 24. The photo gate controller 40 will be described in detail with reference to FIGS. 5 and 6 later.

The timing generator 50 may transmit the photo gate control signals PG and the reference clock signal CK_REF on the same power, voltage and temperature (PVT) conditions. The timing generator 50 will be described in detail with reference to FIG. 7 later.

The photo gate driver 60 may generate a source clock signal by inverting the reference clock signal CK_REF, i.e., shifting the phase of the reference clock signal CK_REF by 180 degrees. The photo gate driver 60 may adjust the phases of the photo gate control signals PG according to the source clock signal. The photo gate driver 60 will be described in detail with reference to FIGS. 8 through 14C later.

Figure 3:
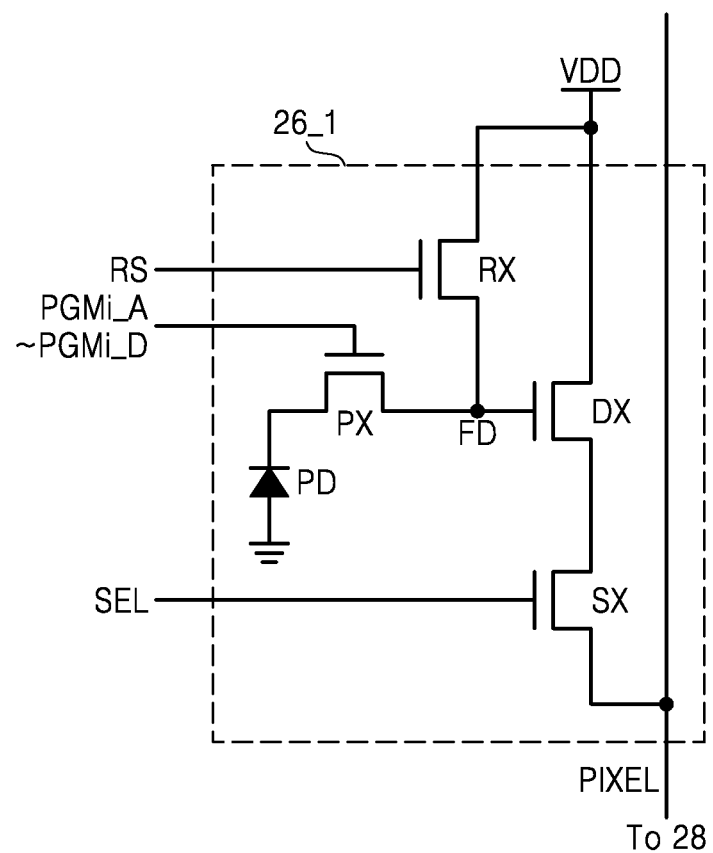
FIG. 3 is a diagram of a structure of a pixel illustrated in FIG. 2 according to an example embodiment of inventive concepts.

FIG. 3 is a diagram of a structure of a pixel 26 illustrated in FIG. 2 according to an example embodiment of inventive concepts. Referring to FIGS. 2 and 3, a pixel 26-1 may have a 1-tap structure. The pixel 26-1 may include a photo diode PD, a photo transistor PX, a floating diffusion node FD, a reset transistor RX, a drive transistor DX, and a select transistor SX. The photo diode PD is an example of a photoelectric conversion element. The photo diode PD may be implemented by at least one of a photo transistor, a photo gate, a pinned photo diode (PPD), and a combination thereof.

FIG. 3 illustrates a 4-transistor (4T) pixel including a single photo diode PD and four MOS transistors PX, RX, DX, and SX, but inventive concepts are not restricted to the embodiments illustrated in FIG. 3.

In operation of the pixel 26-1, the photo diode PD generates variable photocharge according to the intensity of incident light. The photo transistor PX may transfer the photocharge to the floating diffusion node FD according to one of matching photo gate control signals PGMi_A through PGMi_D transmitted from the photo gate driver 60 where 1≤i≤n and "i" is an integer. One of the matching photo gate control signals PGMi_A through PGMi_D may be one of the matching photo gate control signals PGMi_A through PGMi_D described with reference to FIGS. 10 through 13.

The drive transistor DX may amplify and transfer the photocharge to the select transistor SX according to a potential of the photocharge accumulated at the floating diffusion node FD. The select transistor SX has a drain terminal connected to a source terminal of the drive transistor DX. The select transistor SX may output a pixel signal PIXEL in response to the select signal SEL output from the row decoder 34. The reset transistor RX may reset the floating diffusion node FD to VDD in response to the reset signal RS output from the row decoder 34.

Figure 4:
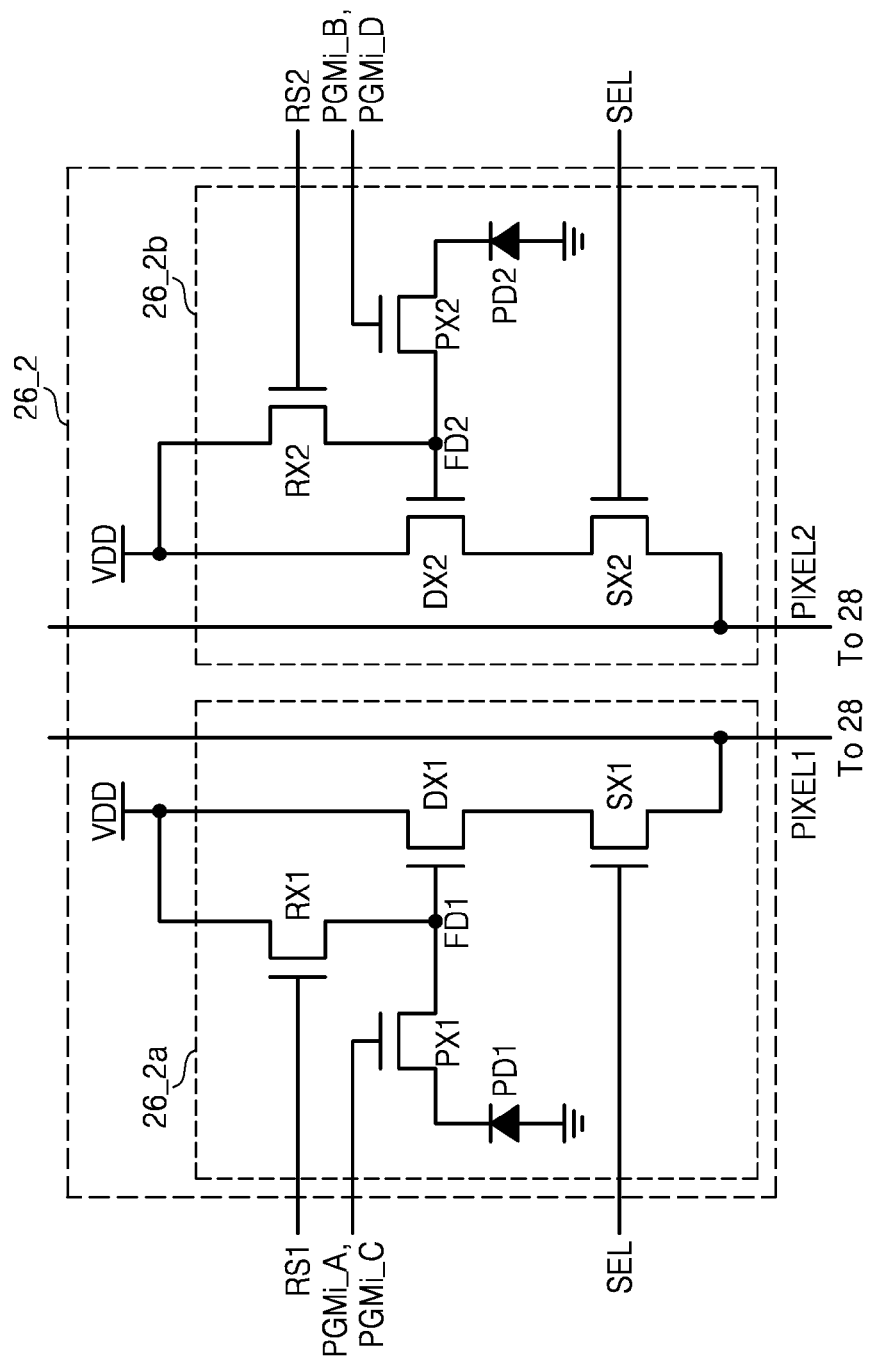
FIG. 4 is a diagram of a structure of the pixel illustrated in FIG. 2 according to an example embodiment of inventive concepts.

FIG. 4 is a diagram of a structure of the pixel 26 illustrated in FIG. 2 according to another example embodiment of inventive concepts. Referring to FIGS. 2 through 4, a pixel 26-2 may have a 2-tap structure. The pixel 26-2 may include a first sub pixel 26-2a and a second sub pixel 26-2b. The structure and operation of the first and second sub pixels 26-2a and 26-2b are substantially the same as those of the pixel 26-1 illustrated in FIG. 3.

However, the first sub pixel 26-2a operates in response to one matching photo gate control signal PGMi_A or PGMi_C transmitted from the photo gate driver 60 while the second sub pixel 26-2b operates in response to another matching photo gate control signal PGMi_B or PGMi_D transmitted from the photo gate driver 60. One matching photo gate control signal PGMi_A or PGMi_C and another matching photo gate control signal PGMi_B or PGMi_D may be simultaneously applied to the first sub pixel 26-2a and the second sub pixel 26-2b, respectively.

Which of the matching photo gate control signals PGMi_A through PGMi_D the first sub pixel 26-2a receives and which of the matching photo gate control signals PGMi_A through PGMi_D the second sub pixel 26-2b receives are not restricted to the features illustrated in FIG. 4. The first sub pixel 26-2a and the second sub pixel 26-2b may respectively receive two different ones of the matching photo gate control signals PGMi_A through PGMi_D.

The phase of a matching photo gate control signal input to the first sub pixel 26-2a is different from the phase of a matching photo gate control signal input to the second sub pixel 26-2b. For instance, the matching photo gate control signal PGMi_A or PGMi_C may have a 90-degree phase different from the matching photo gate control signal PGMi_B or PGMi_D.

One matching photo gate control signal PGMi_A or PGMi_C and another matching photo gate control signal PGMi_B or PGMi_D may together correspond to one of a plurality of matching photo gate control signals PGM1 through PGMn. For instance, the matching photo gate control signal PGM1 corresponding to the first row of the pixel array 24 may include a first matching photo gate control signal PGM1_A and a second matching photo gate control signal PGM1_B, which are simultaneously applied to the pixel 26-2.

Although not shown, each pixel 26 may have a 4-tap structure including four sub pixels. At this time, each of the matching photo gate control signals PGM1 through PGMn may include four matching photo gate control signals which are simultaneously applied to the pixel 26.

Figure 5:
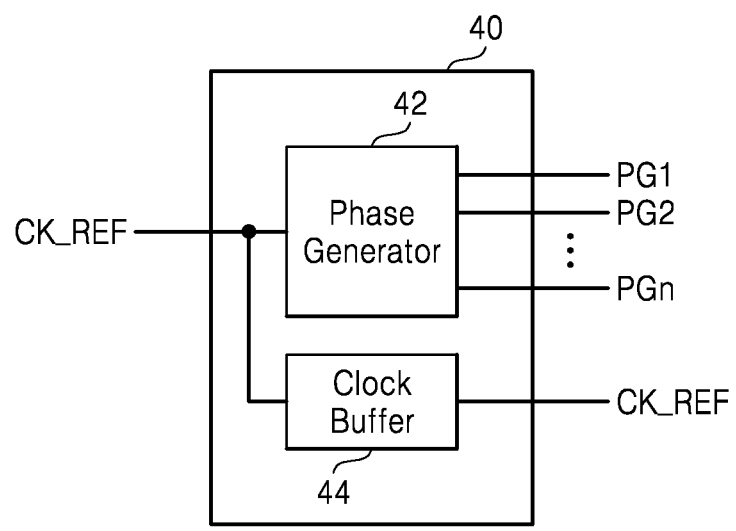
FIG. 5 is a detailed block diagram of a photo gate controller illustrated in FIG. 2 according to an example embodiment.
Figure 6:
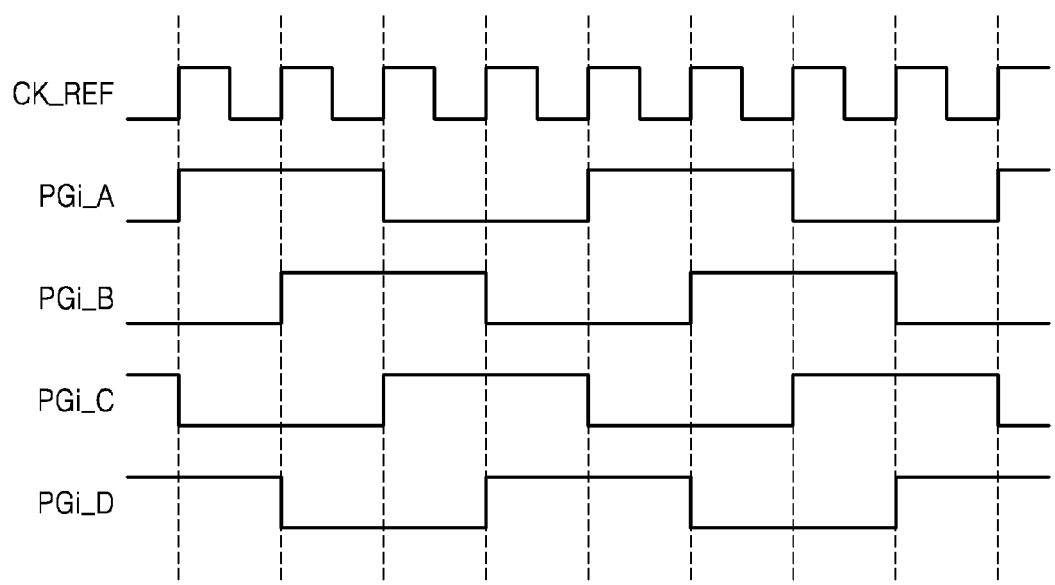
FIG. 6 is a timing chart illustrating the operation of the photo gate controller illustrated in FIG. 5.

FIG. 5 is a detailed block diagram of the photo gate controller 40 illustrated in FIG. 2. FIG. 6 is a timing chart illustrating the operation of the photo gate controller 40 illustrated in FIG. 5.

Referring to FIGS. 2 and 5, the photo gate controller 40 may include a phase generator 42 and a clock buffer 44. The phase generator 42 may receive the reference clock signal CK_REF and generate the photo gate control signals PG1 through PGn using the reference clock signal CK_REF. Although each of the photo gate control signals PG1 through PGn may include a plurality of photo gate control signals (e.g., PGi_A in FIG. 10 and PGi_B in FIG. 11), which are the bases of a plurality of matching photo gate control signals (e.g., PGMi_A and PGMi_B in FIG. 4) simultaneously applied to a pixel 26 according to the structure (e.g., 1-tap, 2-tap, or 4-tap) of the pixel 26 in the pixel array 24, it is assumed hereinafter that each of the photo gate control signals PG1 through PGn includes only one photo gate control signal, which is the base of one matching photo gate control signal (e.g., one of the matching photo gate control signal PGMi_A through PGMi_D in FIG. 3) applied to the pixel 26 at each timing.

The phase generator 42 may generate the photo gate control signals PG1 through PGn having various phases and lower frequency than the reference clock signal CK_REF by inputting the reference clock signal CK_REF to a plurality of flip-flops (not shown). The clock buffer 44 may buffer and output the reference clock signal CK_REF received from the timing controller 30.

FIG. 6 shows signals output from the photo gate controller 40. The reference clock signal CK_REF is output from the clock buffer 44 without being changed. The first through fourth photo gate control signals PGi_A through PGi_D correspond to the photo gate control signal PGi corresponding to the i-th row (1≤i≤n and "i" is an integer) among the photo gate control signals PG1 through PGn. When the pixel 26 has the 1-tap structure, the first through fourth photo gate control signals PGi_A through PGi_D may be sequentially applied to the i-th row, but the order in which the first through fourth photo gate control signals PGi_A through PGi_D are applied to the i-th row is not limited.

The first photo gate control signal PGi_A has 90-, 180- and 270-degree phase differences from the second through fourth photo gate control signals PGi_B through PGi_D, respectively. The frequency of the first through fourth photo gate control signals PGi_A through PGi_D may be ¼ of the frequency of the reference clock signal CK_REF. For instance, when the frequency of the reference clock signal CK_REF is 80 MHz, the frequency of the first through fourth photo gate control signals PGi_A through PGi_D may be 20 Mhz. That the ratio of the frequency of the first through fourth photo gate control signals PGi_A through PGi_D to the frequency of the reference clock signal CK_REF is ¼ is just an example, and inventive concepts are not restricted to this example. The ratio may be lower than ¼.

Figure 7:
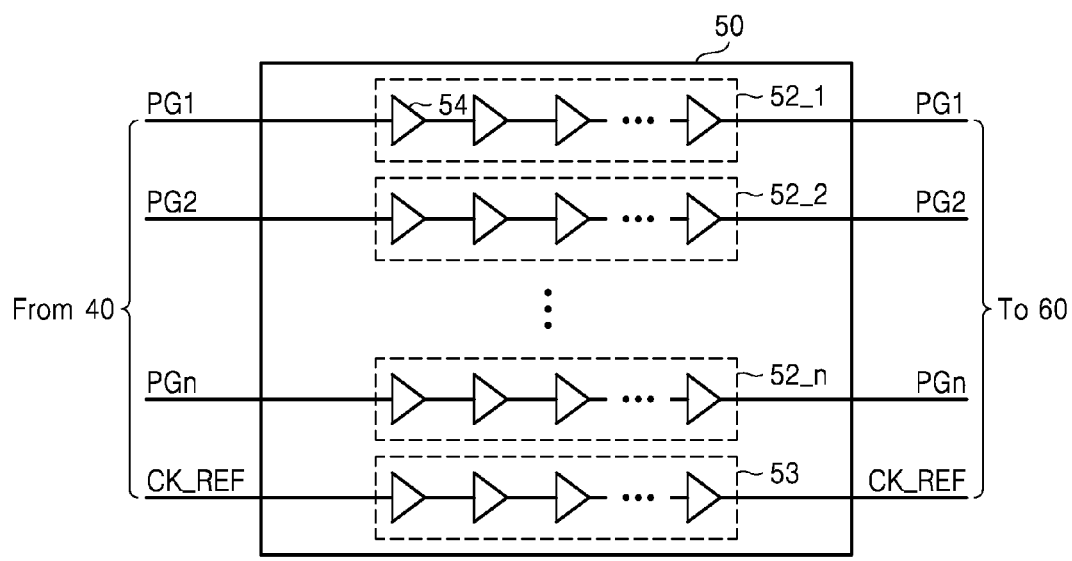
FIG. 7 is a detailed block diagram of a timing generator illustrated in FIG. 2 according to an example embodiment.

FIG. 7 is a detailed block diagram of the timing generator 50 illustrated in FIG. 2. Referring to FIGS. 2 and 7, the timing generator 50 may include a plurality of first buffer groups 52_1 through 52_n respectively corresponding to the photo gate control signals PG1 through PGn and a second buffer group 53 corresponding to the reference clock signal CK_REF. The first buffer groups 52_1 through 52_n and the second buffer group 53 may transmit the photo gate control signals PG1 through PGn and the reference clock signal CK_REF on the same PVT conditions.

The photo gate controller 40 and the photo gate driver 60 may be separated by a distance according to the structure of the image sensor 100 and PVT noise may occur through a signal transmission path between the photo gate controller 40 and the photo gate driver 60. The PVT noise includes noise caused by doping imbalance in wafer processes, noise caused by voltage drop occurring when current passes through different elements when powered up, and noise occurring according to the temperature conditions of the signal transmission path.

When signals pass through very similar paths, they may include very similar PVT noise. At this time, it may be said that the signals have almost the same PVT conditions. When the first buffer groups 52_1 through 52_n and the second buffer group 53 are formed to be very close to each other, they may transmit signals through very similar paths. Accordingly, the photo gate control signals PG1 through PGn and the reference clock signal CK_REF may have almost the same PVT conditions and thus have almost the same PVT noise that causes the change in phases. Therefore, when the photo gate driver 60 matches the phases of the photo gate control signals PG1 through PGn according to a source clock signal generated based on the reference clock signal CK_REF, the photo gate driver 60 can more accurately match the phases with each other.

Each of the first buffer groups 52_1 through 52_n may include a plurality of buffers 54. The second buffer group 53 may also include a plurality of buffers 54. The buffers 54 may speed the transmission of a signal. The number of buffers 54 included in the first buffer groups 52_1 through 52_n and the number of buffer 54 included in the second buffer group 53 may be determined depending on a path through which the photo gate control signals PG1 through PGn are transmitted and a path through which the reference clock signal CK_REF is transmitted, respectively, and the numbers may be different from each other. In other words, the path through which the photo gate control signals PG1 through PGn are transmitted may be different from the path through which the reference clock signal CK_REF is transmitted.

In order to prevent a phase difference from occurring due to different paths, the number of buffers 54 included in the first buffer groups 52_1 through 52_n may be different from the number of buffers 54 included in the second buffer group 53. For instance, when the path through which the reference clock signal CK_REF is transmitted is longer than the path through which the photo gate control signal PG1 corresponding to the first row is transmitted, the second buffer group 53 may include more buffers 54 than the first buffer group 52_1.

Figure 8:
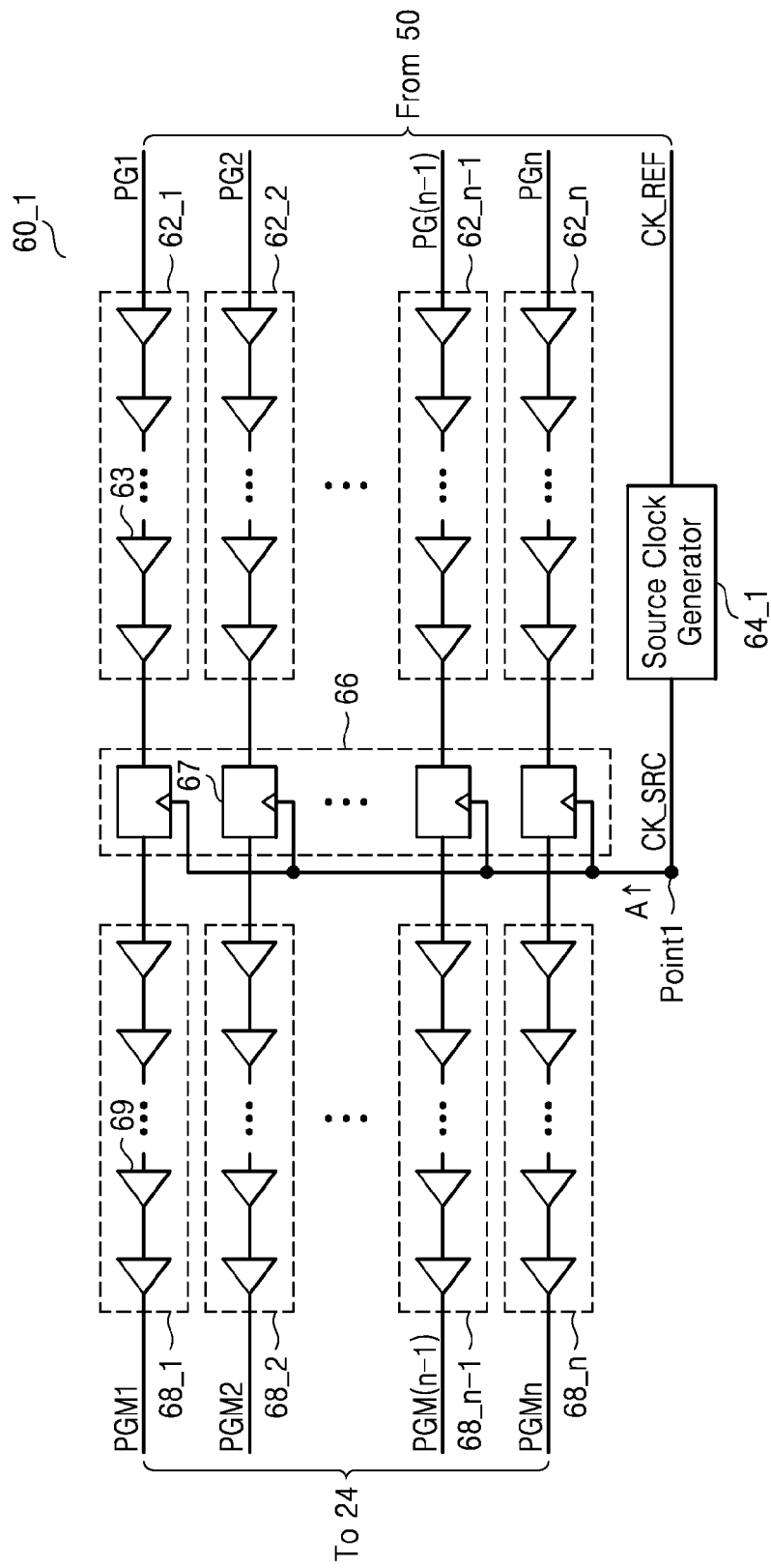
FIG. 8 is a block diagram of an example of a photo gate driver illustrated in FIG. 2 according to an example embodiment.

FIG. 8 is a block diagram of an example 60_1 of the photo gate driver 60 illustrated in FIG. 2. Referring to FIGS. 2 and 8, the photo gate driver 60_1 may include third buffer groups 62_1 through 62_n, a source clock generator 64_1, a phase matching block 66, and fourth buffer groups 68_1 through 68_n.

Each of the third buffer groups 62_1 through 62_n may include a plurality of buffers 63. The buffers 63 may speed the transmission of the photo gate control signals PG1 through PGn. The third buffer groups 62_1 through 62_n may include the same number of buffers 63 so that there is no phase difference among the photo gate control signals PG1 through PGn.

The source clock generator 64_1 may receive the reference clock signal CK_REF from the timing generator 50 and may generate a source clock signal CK_SRC having the opposite phase to (i.e., a phase 180 degrees different from) that of the reference clock signal CK_REF. The source clock generator 64_1 may include a flip-flop (not shown) allowing an input signal and an output signal to have a 180-degree phase difference from each other.

The source clock generator 64_1 may be placed at the outskirts of the third buffer groups 62_1 through 62_n. In other words, a first point Point1 at which the source clock generator 64_1 starts supplying the source clock signal CK_SRC to the phase matching block 66 may be placed at the outskirts of the third buffer groups 62_1 through 62_n.

As shown in FIG. 8, the source clock generator 64_1 is placed beside the third buffer group 62_n to transmit the source clock signal CK_SRC in an A direction from the first point Point1, but inventive concepts are not restricted to the example embodiment illustrated in FIG. 8. The A direction may be perpendicular to the progress direction of the photo gate control signals PG1 through PGn.

The phase matching block 66 may change the phase of the photo gate control signals PG1 through PGn according to the source clock signal CK_SRC so that the phases of the respective photo gate control signals PG1 through PGn match with each other. The phase matching block 66 may change the phase of the photo gate control signals PG1 through PGn by catching the photo gate control signals PG1 through PGn at a rising or falling edge of the source clock signal CK_SRC.

The phase matching block 66 may include a plurality of D flip-flops 67 respectively corresponding to the photo gate control signals PG1 through PGn. The D flip-flops 67 may simultaneously catch the photo gate control signals PG1 through PGn, respectively, at the rising of the source clock signal CK_SRC, thereby matching the phases of the photo gate control signals PG1 through PGn with each other. Catching is an operation of maintaining data input at a rising edge of the source clock signal CK_SRC as an output till the next rising edge. The detailed operation of the phase matching block 66 will be described with reference to FIGS. 10 through 13 later.

Each of the fourth buffer groups 68_1 through 68_n may include a plurality of buffers 69. The buffers 69 may speed the transmission of the matching photo gate control signals PGM1 through PGMn. The fourth buffer groups 68_1 through 68_*n* may include the same number of buffers 69 so that there is no phase difference among the matching photo gate control signals PGM1 through PGMn. A voltage (e.g., 2.8 V) applied to the fourth buffer groups 68_1 through 68_*n* may be the same as a voltage applied to the pixel array 24 and may be higher than a voltage (e.g., 1.2 V) applied to the third buffer groups 62_1 through 62_*n*.

Figure 9:
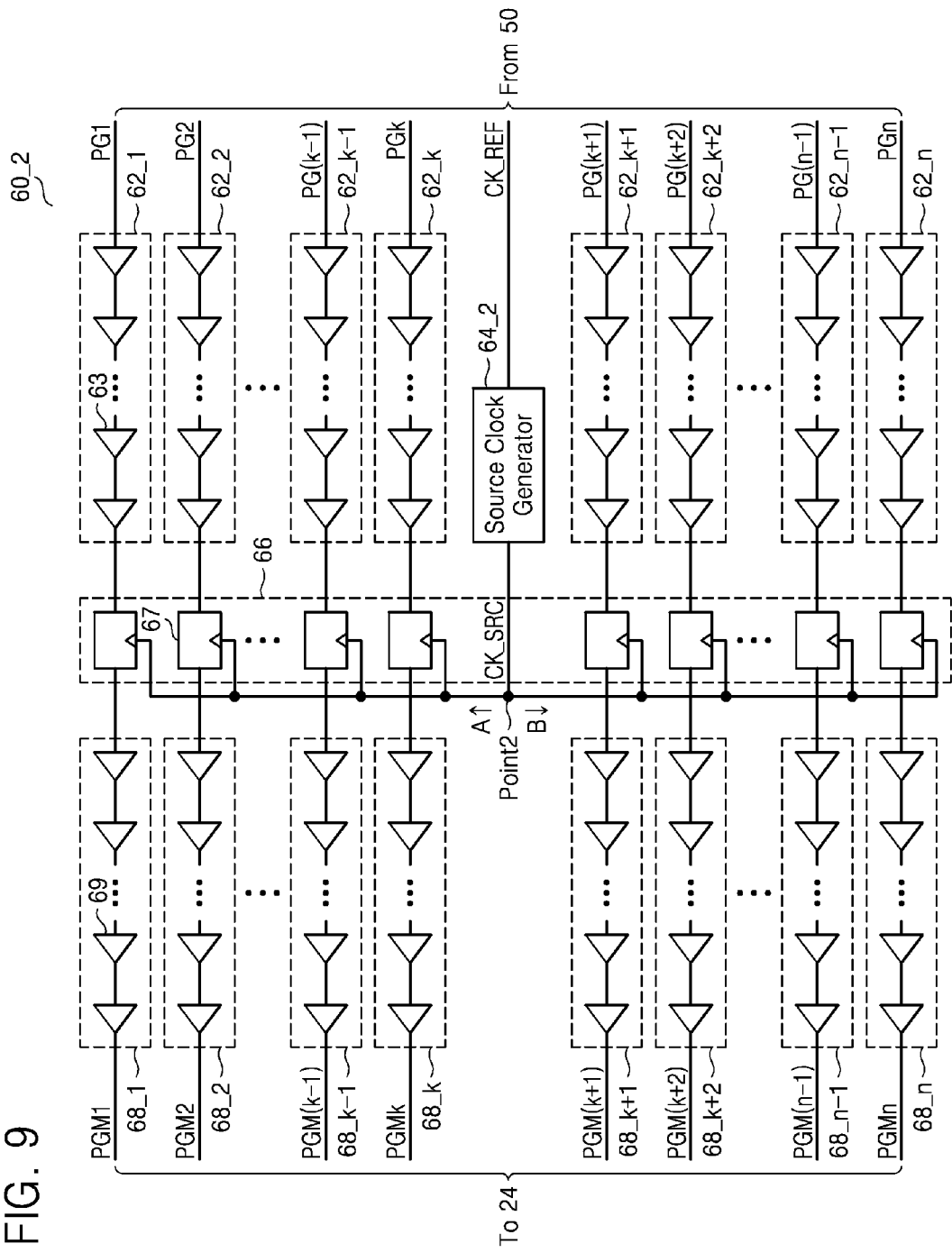
FIG. 9 is a block diagram of another example of the photo gate driver illustrated in FIG. 2.
Figure 10:
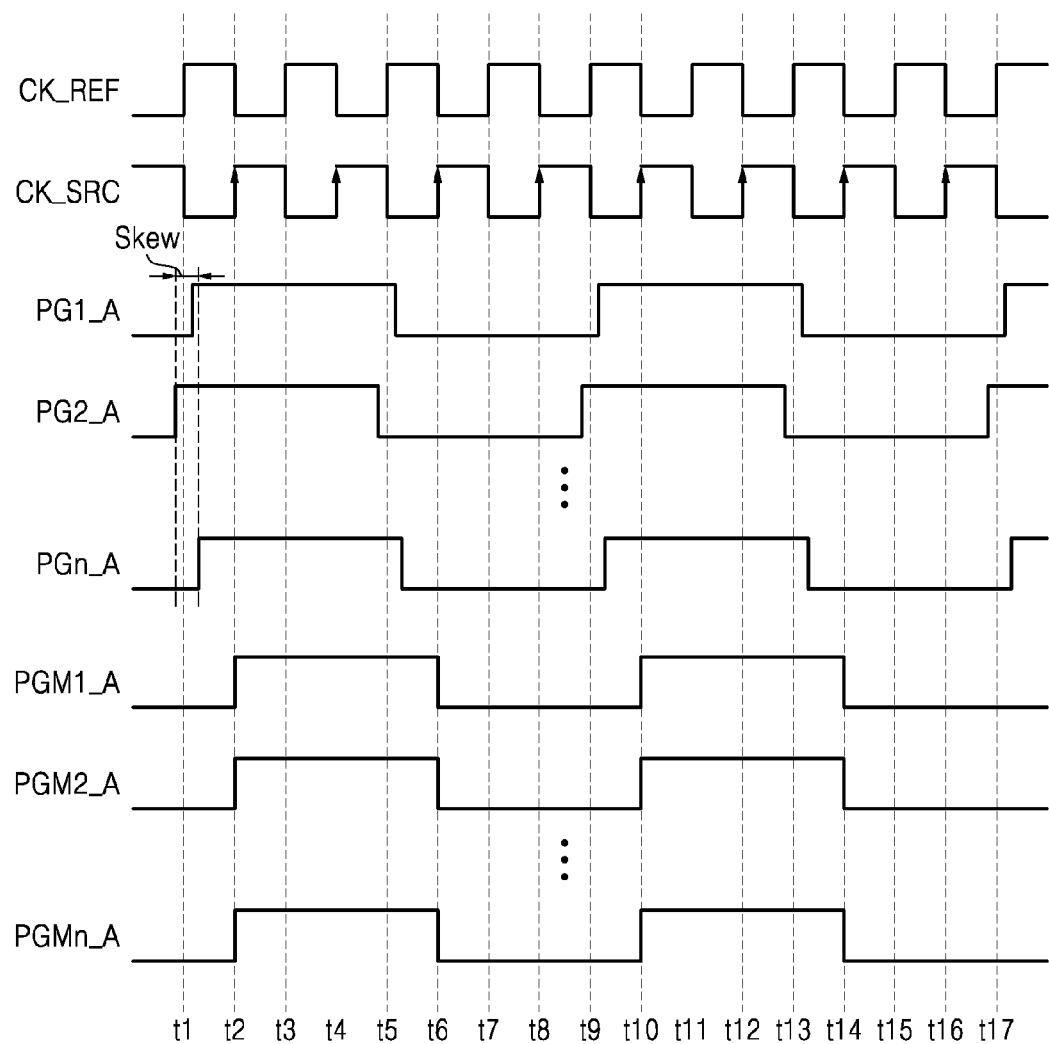
FIGS. 10 through 13 are timing charts illustrating the operation of a phase matching block illustrated in FIGS. 8 and 9.

FIG. 9 is a block diagram of another example 60_2 of the photo gate driver 60 illustrated in FIG. 2. Referring to FIGS. 2, 8, and 9, the photo gate driver 60_2 may include the third buffer groups 62_1 through 62_*n*, a source clock generator 64_2, the phase matching block 66, and the fourth buffer groups 68_1 through 68_*n*. The structure and operation of the third buffer groups 62_1 through 62_*n*, the source clock generator 64_2, the phase matching block 66, and the fourth buffer groups 68_1 through 68_*n* are substantially the same as those of the elements of the photo gate driver 60_1 illustrated in FIG. 8.

However, the source clock generator 64_2 may be placed between the third buffer groups 62_1 through 62_*n*. For instance, as shown in FIG. 9, the source clock generator 64_2 may be placed in the middle among the third buffer groups 62_1 through 62_*n*. In other words, a second point Point2 at which the source clock generator 64_2 starts supplying the source clock signal CK_SRC to the phase matching block 66 may be placed in the middle among the third buffer groups 62_1 through 62_*n*.

As shown in FIG. 9, the source clock generator 64_2 is placed between the third buffer group 62_*k* and the third buffer group 62_(k+1) to transmit the source clock signal CK_SRC in the A direction or a B direction from the second point Point2 where "k" is a value close to ½ of "n", but inventive concepts are not restricted to the example embodiment illustrated in FIG. 9. The A direction may be perpendicular to the progress direction of the photo gate control signals PG1 through PGn and the B direction may be opposite to the A direction.

FIGS. 10 through 13 are timing charts illustrating the operation of the phase matching block 66 illustrated in FIGS. 8 and 9. Referring to FIG. 2 and FIGS. 8 through 10, the source clock signal CK_SRC is made to have a 180-degree phase difference from the reference clock signal CK_REF by the source clock generator 64_1 or 64_2.

When a plurality of first photo gate control signals PG1_A through PGn_A having a reference phase (e.g., 0 degrees) are applied to the phase matching block 66, the phases of the respective first photo gate control signals PG1_A through PGn_A do not exactly match with each other. In other words, the first photo gate control signals PG1_A through PGn_A include random PVT noise according to PVT conditions between the photo gate controller 40 and the photo gate driver 60. Therefore, the first photo gate control signals PG1_A through PGn_A have random phase-skew between rows in the pixel array 24 within a set range (e.g., ¼ of the period of the reference clock signal CK_REF). Because of the phase-skew, transfer of photocharge (the operation of the transistor PX illustrated in FIG. 3) is not performed at the same timing in all rows of the pixel array 24. This leads to an error in the depth image data IDATA_D, decreasing the quality of the depth image data IDATA_D.

The D flip-flops 67 of the phase matching block 66 catch the first photo gate control signals PG1_A through PGn_A, respectively, at rising edges (e.g., t2, t4, t6, t8, t10, t12, t14, and t16. The reference clock signal CK_REF has almost the same PVT noise as the first photo gate control signals PG1_A through PGn_A through the timing generator 50 and thus has a phase difference from the first photo gate control signals PG1_A through PGn_A within a range of the phase-skew between the first photo gate control signals PG1_A through PGn_A. Therefore, the source clock signal CK_SRC generated based on the reference clock signal CK_REF has a less phase difference from the first photo gate control signals PG1_A through PGn_A, thereby enabling an accurate catching operation. The accurate catching operation is an operation of generating a plurality of first matching photo gate control signals PGM1_A through PGMn_A that retain the shape of the first photo gate control signals PG1_A through PGn_A and have a wanted phase (i.e., no phase difference from each other).

The source clock signal CK_SRC has a 180-degree phase difference from the reference clock signal CK_REF to prevent the rising edges of the source clock signal CK_SRC from overlapping a period, i.e., the rising or falling edges of the first photo gate control signals PG1_A through PGn_A in which the data value of the first photo gate control signals PG1_A through PGn_A changes. The source clock signal CK_SRC also has a frequency four times that of the first photo gate control signals PG1_A through PGn_A so that the accurate catching operation can also be performed with respect to second photo gate control signals PG1_B through PGn_B, third photo gate control signals PG1_C through PGn_C, and fourth photo gate control signals PG1_D through PGn_D, which will be described with reference to FIGS. 11 through 13.

The D flip-flops 67 of the phase matching block 66 simultaneously catch the first photo gate control signals PG1_A through PGn_A, respectively, at each of the rising edges t2, t4, t6, t8, t10, t12, t14, and t16 of the source clock signal CK_SRC, so that unlike the first photo gate control signals PG1_A through PGn_A, the first matching photo gate control signals PGM1_A through PGMn_A do not has phase-skew.

Figure 11:
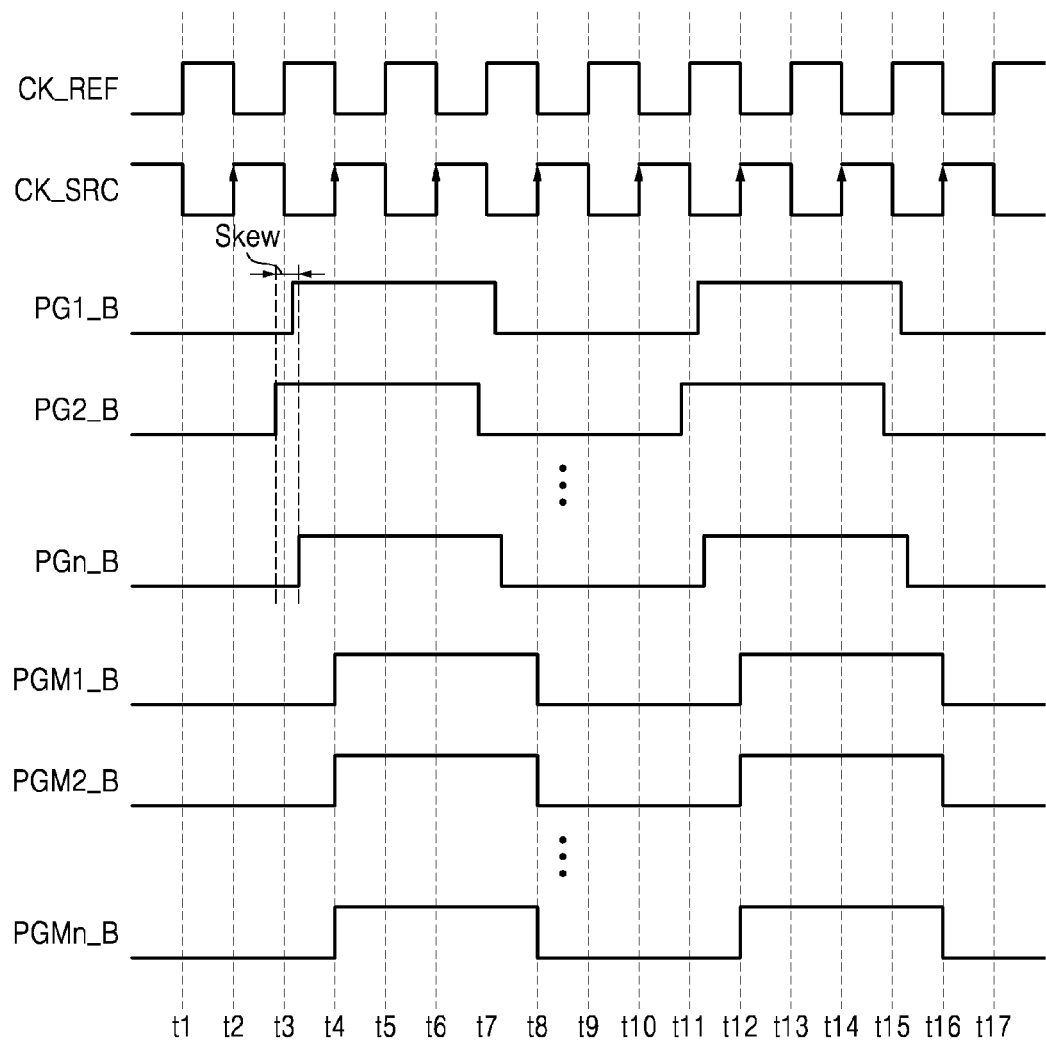
Figure 12:
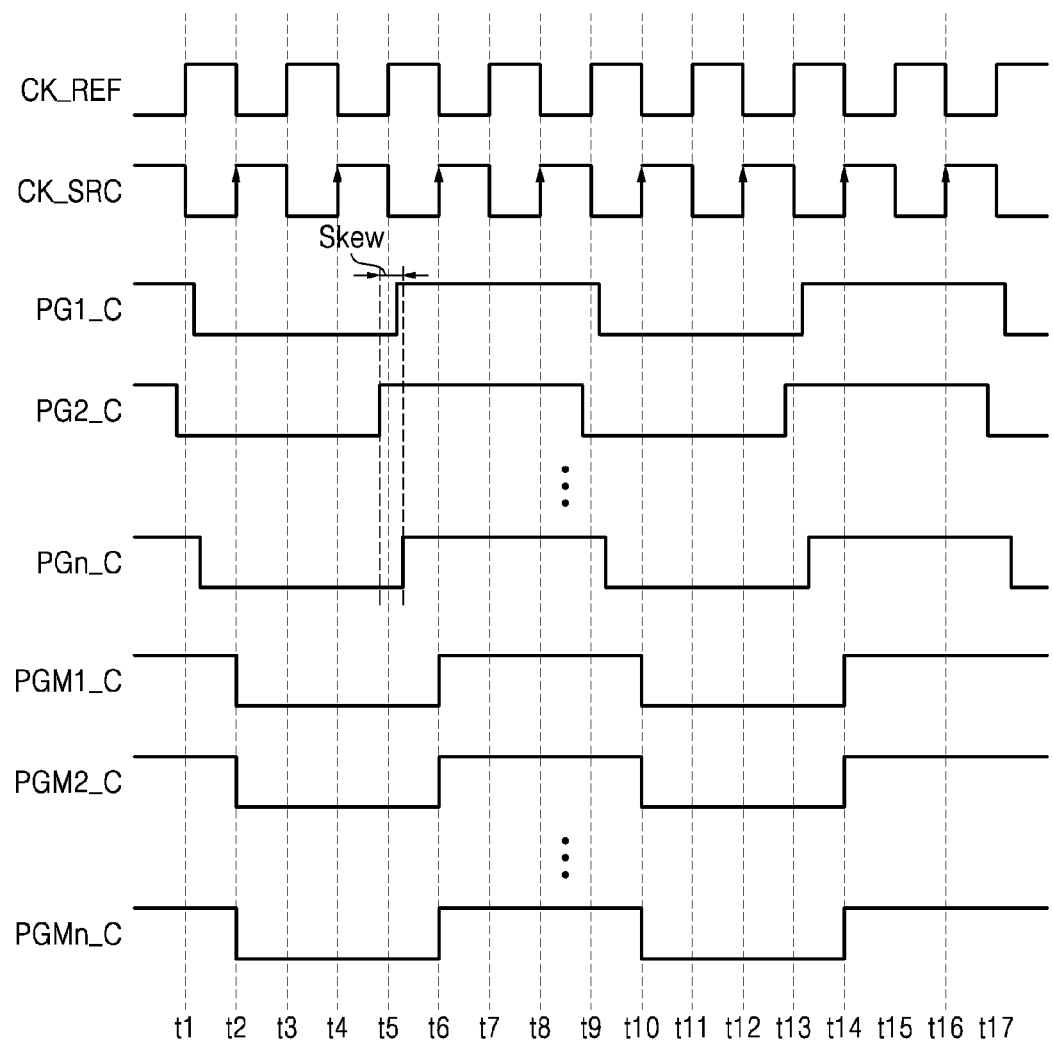
Figure 13:
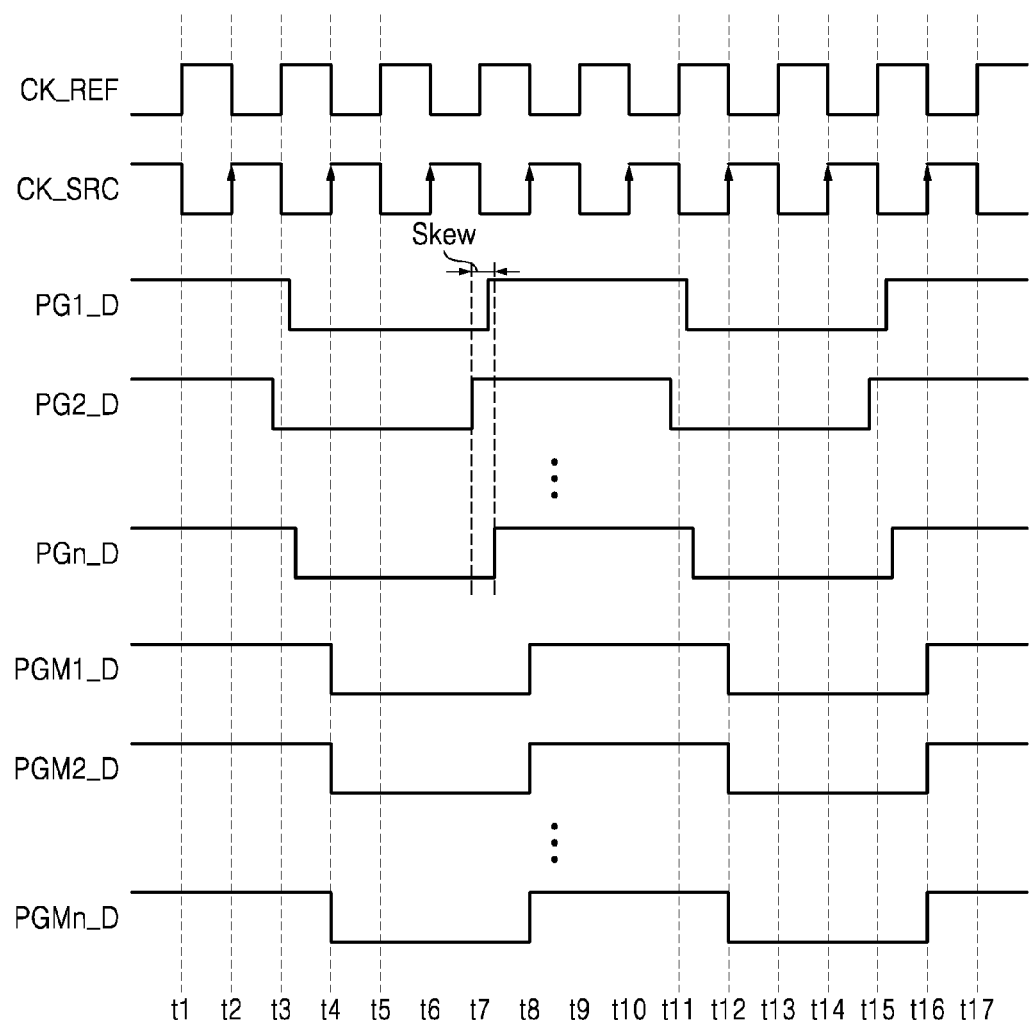

Referring to FIGS. 11 through 13, the D flip-flops 67 of the phase matching block 66 also the catching operation on the second photo gate control signals PG1_B through PGn_B having a 90-degree phase difference from the first photo gate control signals PG1_A through PGn_A, the third photo gate control signals PG1_C through PGn_C having a 180-degree phase difference from the first photo gate control signals PG1_A through PGn_A, and the fourth photo gate control signals PG1_D through PGn_D having a 270-degree phase difference from the first photo gate control signals PG1_A through PGn_A at a rising edge of the source clock signal CK_SRC. Like the first matching photo gate control signals PGM1_A through PGMn_A described with reference to FIG. 10, second matching photo gate control signals PGM1_B through PGMn_B, third matching photo gate control signals PGM1_C through PGMn_C, and fourth matching photo gate control signals PGM1_D through PGMn_D do not have phase-skew unlike the second photo gate control signals PG1_B through PGn_B, the third photo gate control signals PG1_C through PGn_C, and the fourth photo gate control signals PG1_D through PGn_D.

As described above, the image sensor 100 matches the phases of the photo gate control signals PG1 through PGn using the source clock signal CK_SRC generated based on the reference clock signal CK_REF, thereby increasing the quality of the depth image data IDATA_D. In addition, the image sensor 100 transmits the reference clock signal CK_REF and the photo gate control signals PG1 through PGn on the same PVT conditions and uses the source clock signal CK_SRC having the opposite phase to that of the reference clock signal CK_REF, thereby accurately matching the phases of the photo gate control signals PG1 through PGn.

Figure 14A:
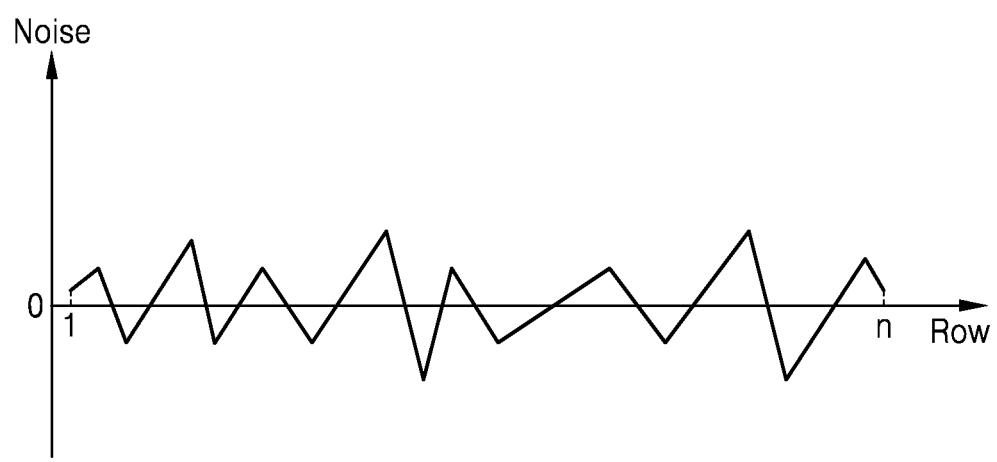
FIGS. 14A through 14C are diagrams for explaining the effect of the photo gate drivers illustrated in FIGS. 8 and 9.
Figure 14B:
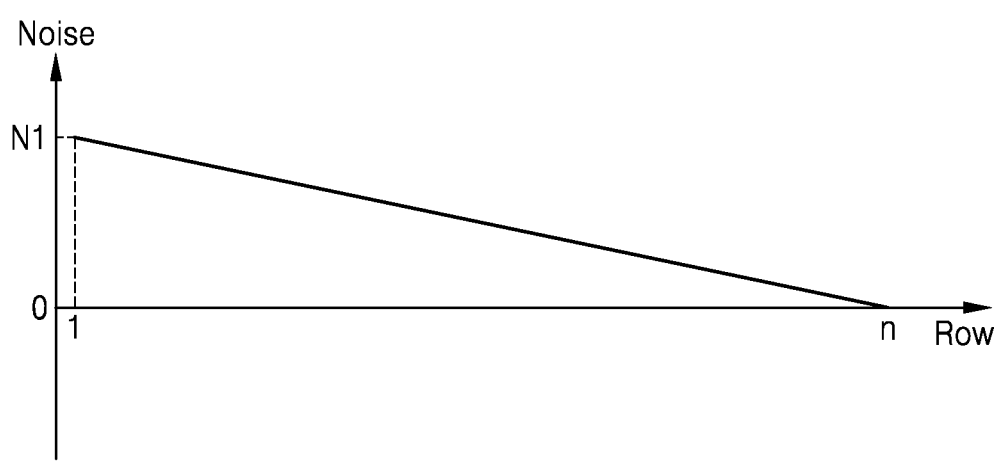
Figure 14C:
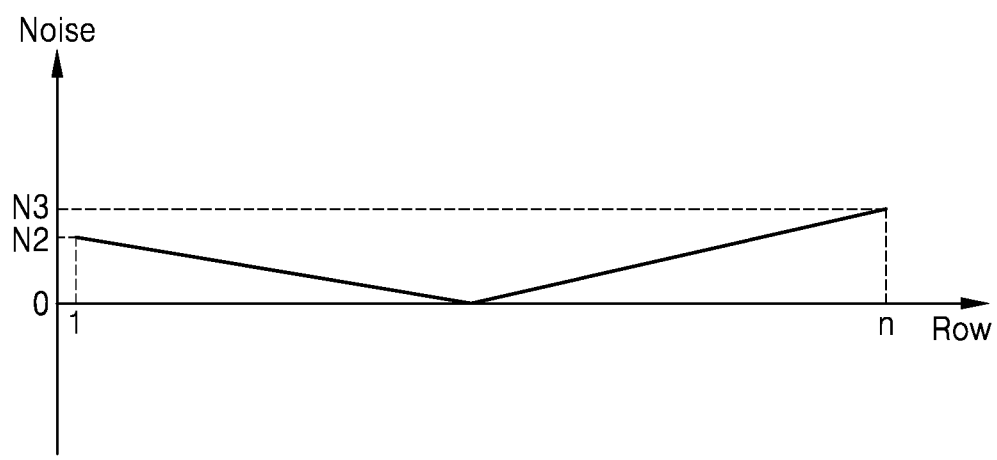

FIGS. 14A through 14C are diagrams for explaining the effect of the photo gate drivers 60_1 and 60_2 illustrated in FIGS. 8 and 9. Referring to FIGS. 8 through 14C, the photo gate control signals (e.g., PG1_A through PGn_A) include random PVT noise according to the PVT conditions between the photo gate controller 40 and the photo gate driver 60, as described above with reference to FIG. 10.

Referring to FIG. 14A, the photo gate control signals PG1 through PGn include random noise from the first row to the n-th row. When the photo gate control signals PG1 through PGn having the random noise are input to the pixel array 24, it is very difficult to correct the noise in the pixel array 24. As a result, the quality of the depth image data IDATA_D is decreased.

FIG. 14B illustrates noise occurring in the rows when the phase matching block 66 illustrated in FIG. 8 generates and applies the matching photo gate control signals PGM1 through PGMn to the pixel array 24. Ideally, it is expected that there is no phase-skew due to the phase matching block 66 using the source clock signal CK_SRC. However, when the source clock signal CK_SRC is applied in the A direction, the source clock signal CK_SRC received by a D flip-flop 67 receiving the photo gate control signal PG1 may have a lower level than the source clock signal CK_SRC received by a D flip-flop 67 receiving the photo gate control signal PGn because of resistance components in a path through which the source clock signal CK_SRC passes. This causes noise to occur in the A direction, as shown in FIG. 14B. However, unlike the random noise illustrated in FIG. 14A, the noise occurs linearly along the A direction, and therefore, the ISP 200 can easily correct the noise.

FIG. 14C illustrates noise occurring in the rows when the phase matching block 66 illustrated in FIG. 9 generates and applies the matching photo gate control signals PGM1 through PGMn to the pixel array 24. Similarly to the graph shown in FIG. 14B, the noise occurs linearly along either the A direction or the B direction, but the highest noise level (i.e., N2 or N3) in the graph shown in FIG. 14C is lower than (is around ½ of) the highest noise level (i.e., N1) in the graph shown in FIG. 14B since the source clock signal CK_SRC is applied from the second point Point2 not the first point Point1. As a result, the amount of computation necessary for the ISP 200 to correct the noise is decreased.

Figure 15:
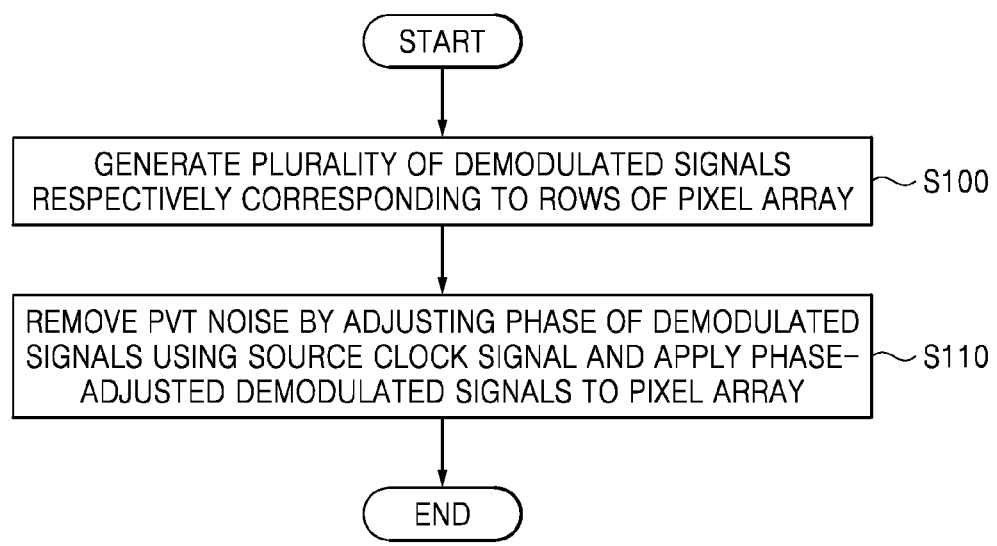
FIG. 15 is a schematic flowchart of a method of operating the image sensor illustrated in FIG. 2 according to an example embodiment.

FIG. 15 is a schematic flowchart of a method of operating the image sensor 100 illustrated in FIG. 2. Referring to FIGS. 1, 2, 8, 9, and 15, the photo gate controller 40 may generate a plurality of demodulated signals, i.e., the photo gate control signals PG1 through PGn respectively corresponding to the rows of the pixel array 24 using the reference clock signal CK_REF output from the timing controller 30 in operation S100.

The photo gate driver 60 adjusts the phase of the photo gate control signals PG1 through PGn using the source clock signal CK_SRC to remove PVT noise from the photo gate control signals PG1 through PGn and applies the phase-adjusted photo gate control signals, i.e., the matching photo gate control signals PGM1 through PGMn to the pixel array 24 in operation S110. In detail, the phase matching block 66 changes the phases of the respective photo gate control signals PG1 through PGn in response to a rising edge of the source clock signal CK_SRC to generate the matching photo gate control signals PGM1 through PGMn.

The pixel array 24 may include the pixels 26 that receive the matching photo gate control signals PGM1 through PGMn and generate a pixel signal. The pixels 26 may have the 1-tap or 2-tap structure.

Figure 16:
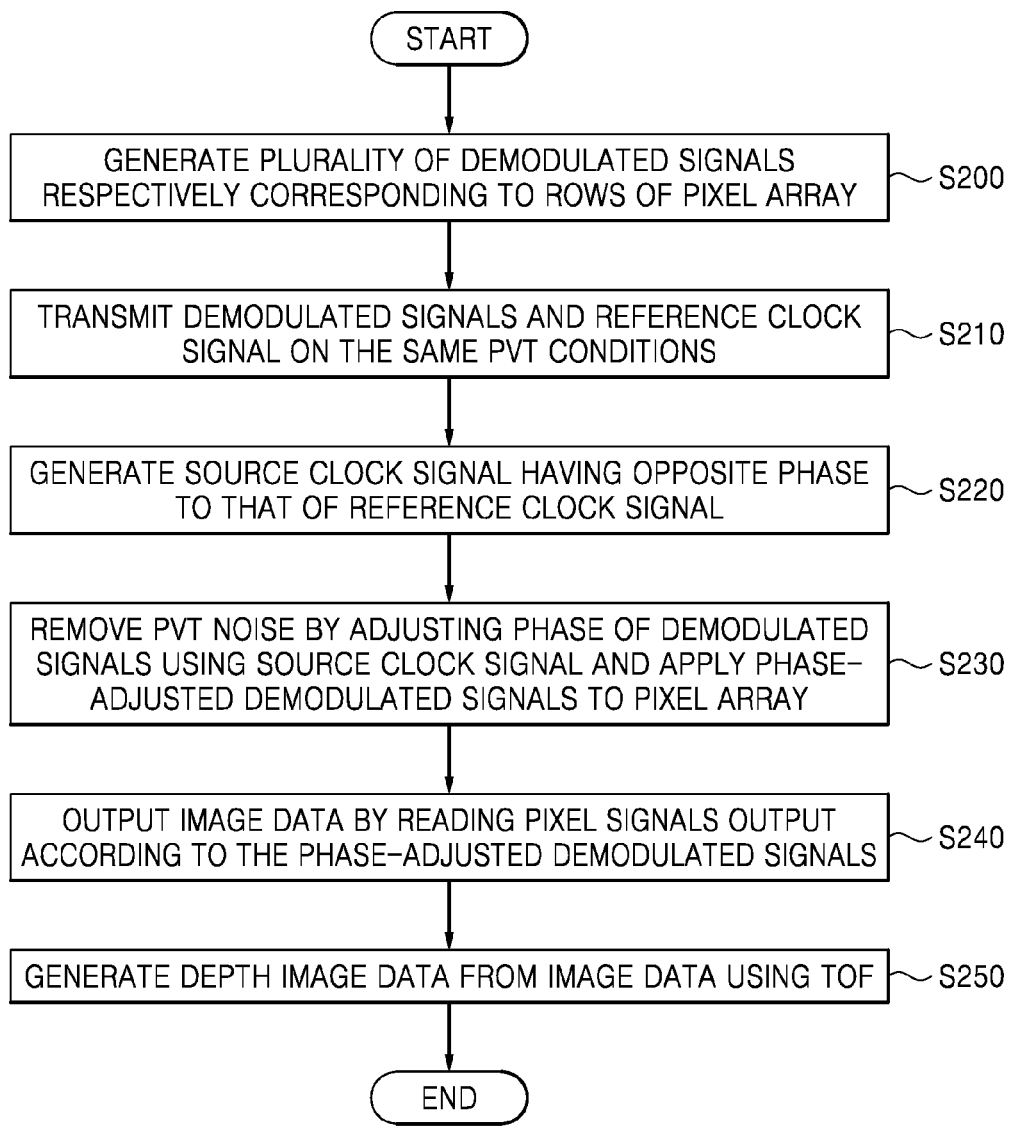
FIG. 16 is a detailed flowchart of the method of operating the image sensor illustrated in FIG. 2 according to an example embodiment.

FIG. 16 is a detailed flowchart of the method of operating the image sensor 100 illustrated in FIG. 2. Referring to FIGS. 1, 2, 8, 9, 15, and 16, since operations S200 and S230 are substantially the same as operations S100 and S110 illustrated in FIG. 15, descriptions thereof will be omitted.

The timing generator 50 may transmit the photo gate control signals PG1 through PGn and the reference clock signal CK_REF on the same PVT conditions in operation S210. The photo gate driver 60 may generate the source clock signal CK_SRC by inverting the reference clock signal CK_REF, i.e., by shifting the phase of the reference clock signal CK_REF by 180 degrees in operation S220.

The source clock signal CK_SRC may be applied from the first point Point1 shown in FIG. 8 in the A direction which is perpendicular to the progress direction of the photo gate control signals PG1 through PGn. Alternatively, the source clock signal CK_SRC may be applied from the second point Point2 shown in FIG. 9 in the A direction which is perpendicular to the progress direction of the photo gate control signals PG1 through PGn and the B direction opposite to the A direction.

The readout circuit 28 may generate the image data IDATA based on pixel signals output from the pixel array 24 in operation 5240. The ISP 200 may generate depth information from the image data IDATA using the TOF and may generate the depth image data IDATA_D based on the depth information in operation 5250.

Figure 17:
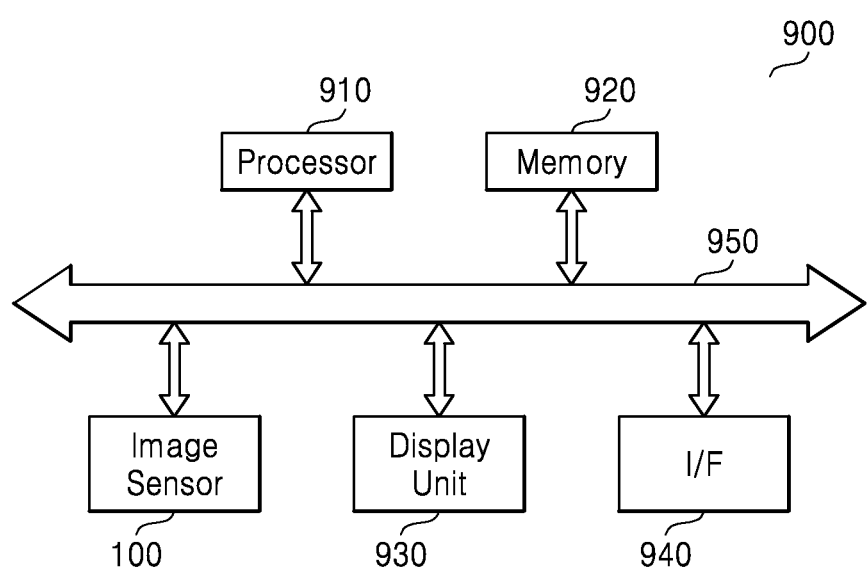
FIG. 17 is a block diagram of a data processing system including an image sensor illustrated in FIG. 1 according to an example embodiment of inventive concepts.

FIG. 17 is a block diagram of a data processing system 1100 including the image sensor illustrated in FIG. 1 according to an example embodiment of inventive concepts. Referring to FIGS. 1 and 17, the image processing system 900 may include an image sensor 100, a processor 900, a memory 920, a display unit 930 and an interface 940.

The processor 910 may control operations of the image sensor 100 or process image data output from the image sensor 100. For example, the processor 910 may generate two-dimensional (2D) depth image data based on depth information output from the image sensor 100. According to an example embodiment, the processor 910 may be the ISP 200.

The memory 920 may store the image generated by the processor 910 and program for controlling the operations of the image sensor 100 via a bus 950 according to control of the processor 910. The processor 910 may access information stored in the memory 920 and execute the program stored in the memory 920. The memory 920 may be implemented as non-volatile memory.

The display unit 930 may receive the depth image from the processor 910 or the memory 920, and display the depth image via a display such as a LCD (Liquid Crystal Display), a LED display, an OLED display, an AMOLED (Active Matrix Organic Light Emitting Diodes) display, or a flexible display.

The interface 940 may be implemented as an interface for inputting/outputting two-dimensional (2D) or three-dimensional (3D) image. The interface 940 may be implemented as wireless interface.

Figure 18:
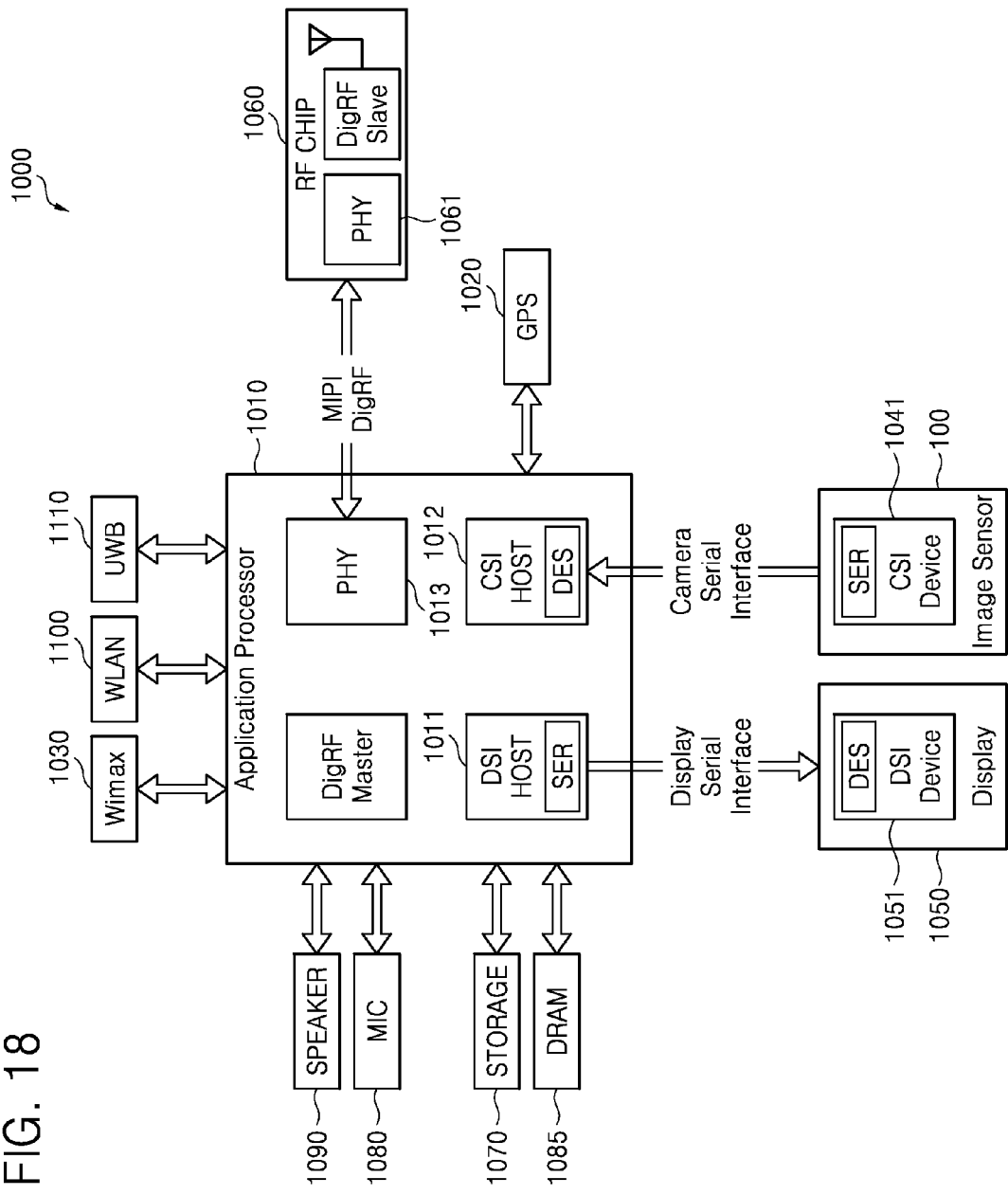
FIG. 18 is a block diagram of an electronic system including an image sensor illustrated in FIG. 1 according to an example embodiment of inventive concepts.

FIG. 18 is a block diagram of an electronic system including an image sensor illustrated in FIG. 1 according to an example embodiment of inventive concepts. The electronic system 1000 may be implemented by a data processing apparatus, such as a mobile phone, a personal digital assistant (PDA), a portable media player (PMP), an IP TV, or a smart phone that can use or support the MIPIR (mobile industry processor interface) interface. The electronic system 1000 includes an image sensor 100, an application processor 1010, and a display 1050.

A camera serial interface (CSI) host 1012 included in the application processor 1010 performs serial communication with a CSI device 1041 included in the image sensor 100 through CSI. For example, an optical de-serializer (DES) may be implemented in the CSI host 1012, and an optical serializer (SER) may be implemented in the CSI device 1041.

A display serial interface (DSI) host 1011 included in the application processor 1010 performs serial communication with a DSI device 1051 included in the display 1050 through DSI. For example, an optical serializer may be implemented in the DSI host 1011, and an optical de-serializer may be implemented in the DSI device 1051.

The electronic system 1000 may also include a radio frequency (RF) chip 1060 which communicates with the application processor 1010. A physical layer (PHY) 1013 of the electronic system 1000 and a PHY of the RF chip 1060 communicate data with each other according to a MIPI DigRF standard. The electronic system 1000 may further include at least one element among a GPS 1020, a storage device 1070, a microphone 1080, a DRAM 1085 and a speaker 1290. The electronic system 1000 may communicate using Wimax (World Interoperability for Microwave Access) 1030, WLAN (Wireless LAN) 1100 and/or UWB (Ultra Wideband) 1110, etc.

As described above, according to example embodiments of inventive concepts, the phases of respective photo gate control signals are matched using a signal generated based on a reference clock signal, so that the quality of depth images is increased in an image sensor and an image processing system including the image sensor. In addition, the reference clock signal and the photo gate control signals are transmitted on the same PVT conditions, so that the phases of the photo gate control signals are matched accurately.

While inventive concepts have been particularly shown and described with reference to example embodiments thereof, it will be understood by those of ordinary skill in the art that various changes in forms and details may be made therein without departing from the spirit and scope of inventive concepts as defined by the following claims.

What is claimed is:

1. An image sensor comprising:
   a photo gate controller configured to generate a plurality of demodulated signals respectively corresponding to a plurality of rows of a pixel array; and
   a photo gate driver configured to adjust a phase of the demodulated signals using a source clock signal to remove power, voltage and temperature (PVT) noise and to apply the phase-adjusted demodulated signals to the pixel array.

2. The image sensor of claim 1, further comprising:
   A timing generator configured to transmit the demodulated signals and reference clock signal to the photo gate driver.

3. The image sensor of claim 2, wherein the timing generator comprises a plurality of first buffer groups configured to transmit the demodulated signals and a second buffer group configured to transmit the reference clock signal and the number of buffers included in each of the first buffer groups and the second buffer group is based on a path through which the demodulated signals and the reference clock signal are transmitted.

4. The image sensor of claim 1, wherein the photo gate controller is configured to receive a reference clock signal and generate the demodulated signals, a phase of the demodulated signals is one of first through fourth phases, and a frequency of the demodulated signals is lower than a frequency of the reference clock signal.

5. The image sensor of claim 1, wherein the photo gate driver is configured to generate the source clock signal having an opposite phase to a phase of a reference clock signal.

6. The image sensor of claim 1, wherein the photo gate driver comprises a phase matching block configured to change the phase of the demodulated signals in response to a rising edge of the source clock signal.

7. The image sensor of claim 6, wherein the phase matching block comprises a plurality of D flip-flops that change the phase of the demodulated signals, respectively.

8. The image sensor of claim 1, wherein the source clock signal is applied in a direction perpendicular to a progress direction of the demodulated signals.

9. The image sensor of claim 1, wherein the source clock signal is applied in a first direction perpendicular to a progress direction of the demodulated signals and a second direction opposite to the first direction.

10. The image sensor of claim 1, wherein the pixel array comprises a plurality of pixels that sense photocharges generated from incident light according to the phase-adjusted demodulate signals and respectively output pixel signals.

11. An image processing system comprising:
    an image sensor including,
        a pixel array including rows of pixels and configured to produce image data,
        a timing generator configured to generate a plurality of gate control signals based on a reference clock, each gate control signal corresponding to one of the rows of the pixel array, and
        a gate driver configured to generate matched gate control signals by changing the phases of the plurality of gate control signals such that the generated matched gate control signals have a desired phase, the gate driver configured to apply the generated matched gate control signals to the pixel array of the image sensor.

12. The image processing system of claim 11, wherein the gate driver is configured to generate a source clock signal based on the reference clock signal, the source clock signal having a phase difference from the photo gate control signals that is smaller than a phase difference between the reference clock signal and the photo gate control signals, the matched gate control signals being based on the source clock signal.

13. The image processing system of claim 12, wherein the gate driver is configured to generate the source clock signal to have a 180 degree phase difference from the reference clock signal.

14. The image processing system of claim 12, wherein the gate driver is configured to generate the source clock signal to have a frequency higher than a frequency of the gate control signals.

15. The image processing system of claim 12, wherein the gate driver includes a source clock generator configured to generate the source clock signal, the source clock generator being between lines carrying the gate control signals.

* * * * *